US010101780B2

(12) United States Patent
Remis et al.

(10) Patent No.: US 10,101,780 B2
(45) Date of Patent: Oct. 16, 2018

(54) SECONDARY MANAGEMENT DEVICE DETERMINING DESIRED FAN SPEED UPON FAILURE OF PRIMARY MANAGEMENT DEVICE

(71) Applicant: Lenovo Enterprise Solutions (Singapore) PTE. LTD., New Tech Park (SG)

(72) Inventors: Luke D. Remis, Raleigh, NC (US); Gregory David Sellman, Morrisville, NC (US); Christopher Landon Wood, Chapel Hill, NC (US)

(73) Assignee: Lenovo Enterprise Solutions (Singapore) PTE. LTD., New Tech Park (SG)

( * ) Notice: Subject to any disclaimer, the term of this patent is extended or adjusted under 35 U.S.C. 154(b) by 309 days.

(21) Appl. No.: 14/964,055

(22) Filed: Dec. 9, 2015

(65) Prior Publication Data

US 2017/0168530 A1  Jun. 15, 2017

(51) Int. Cl.
*G06F 1/20* (2006.01)
(52) U.S. Cl.
CPC .................... *G06F 1/206* (2013.01)
(58) Field of Classification Search
CPC .............................. G06F 1/206; G06F 11/18
USPC ........................................................ 700/282
See application file for complete search history.

(56) References Cited

U.S. PATENT DOCUMENTS

| 6,199,173 | B1* | 3/2001 | Johnson | G06F 1/206 714/3 |
| 6,249,885 | B1* | 6/2001 | Johnson | G06F 1/20 709/224 |
| 8,416,571 | B2* | 4/2013 | Mizumura | H05K 7/20836 361/679.48 |
| 9,658,662 | B2* | 5/2017 | Cader | G06F 1/206 |
| 9,819,532 | B2* | 11/2017 | Zhou | H04L 41/00 |
| 2004/0268166 | A1* | 12/2004 | Farkas | G06F 1/206 713/320 |
| 2006/0101833 | A1* | 5/2006 | Lucas | G06F 1/206 62/126 |
| 2006/0248360 | A1* | 11/2006 | Fung | G06F 1/206 713/300 |
| 2007/0011288 | A1* | 1/2007 | Cases | G06F 1/206 709/223 |

(Continued)

*Primary Examiner* — Kenneth M Lo
*Assistant Examiner* — Michael J Huntley
(74) *Attorney, Agent, or Firm* — Jason Friday

(57) ABSTRACT

A power device powers a hardware component and a fan cools the component. A primary management device monitors a first characteristic, which is the temperature of the component or the power provided by the power device, and determines a desired fan speed of the fan based on the first characteristic. A secondary management device monitors a second characteristic, which is the temperature of the component or the power provided by the power device, and sets the fan speed to the desired fan speed determined by the primary management device. The secondary management device constructs a profile of the fan speed in relation to the second characteristic by periodically recording the fan speed and the second characteristic. In response to the primary management device failing, the secondary management device determines the desired fan speed based on the profile and set the fan speed to the desired fan speed that it determined.

20 Claims, 2 Drawing Sheets

(56) References Cited

U.S. PATENT DOCUMENTS

| | | | |
|---|---|---|---|
| 2007/0027580 A1* | 2/2007 | Ligtenberg | G05D 23/19 |
| | | | 700/300 |
| 2007/0089446 A1* | 4/2007 | Larson | G05D 23/1931 |
| | | | 62/259.2 |
| 2008/0281475 A1* | 11/2008 | Hirai | G05D 23/1931 |
| | | | 700/300 |
| 2012/0084551 A1* | 4/2012 | Cheng | G06F 1/206 |
| | | | 713/2 |
| 2012/0203393 A1* | 8/2012 | Dumitru | G06F 1/206 |
| | | | 700/300 |
| 2013/0320904 A1* | 12/2013 | Yang | H02P 29/021 |
| | | | 318/490 |
| 2014/0202678 A1* | 7/2014 | Goth | H05K 7/20772 |
| | | | 165/287 |
| 2014/0277750 A1* | 9/2014 | Artnnan | G05B 15/02 |
| | | | 700/275 |
| 2014/0334101 A1* | 11/2014 | Yu | H05K 7/20209 |
| | | | 361/695 |
| 2015/0062815 A1* | 3/2015 | Nomura | H05K 7/20209 |
| | | | 361/695 |
| 2015/0177750 A1* | 6/2015 | Bailey | H05K 7/20736 |
| | | | 700/275 |
| 2016/0239067 A1* | 8/2016 | Lovicott | G06F 1/3206 |
| 2016/0274629 A1* | 9/2016 | Lovicott | G06F 1/206 |

* cited by examiner

SECONDARY MANAGEMENT DEVICE DETERMINING DESIRED FAN SPEED UPON FAILURE OF PRIMARY MANAGEMENT DEVICE

BACKGROUND

Computing devices, like computers such as servers, include many different types of hardware components that generate heat, including processors, memory, hard disk drives, and so on. To ensure the proper functioning of these components, they have to be cooled, which is typically achieved at least in part by employing fans that exhaust hot air from the case or enclosure of a computing device. Some hardware components have their own dedicated fans. A computing device may also include system-level or subsystem/zone-level fans. The former type of fan is used to exhaust hot air from the computing device as a whole, whereas the latter type is used to exhaust hot air from a corresponding subsystem or zone of the computing device.

SUMMARY

An example computing system includes a hardware component, a power device to provide power to at least the hardware component, and a fan to cool at least the hardware component. The system includes a primary management device to monitor a first characteristic that is one of a temperature of the hardware component and the power provided by the power device to at least the hardware component, and to determine a desired fan speed of the fan based on the first characteristic. The system includes a secondary management device to monitor a second characteristic that is one of the temperature of the hardware component and the power provided by the power device to at least the hardware component, the second characteristic different than the first characteristic. The secondary management device is to control a fan speed of the fan by setting the fan speed to the desired fan speed determined by the primary management device, and construct a profile of the fan speed in relation to the second characteristic by periodically recording the fan speed and the second characteristic. In response to the primary management device failing, the secondary management device is to determine the desired fan speed of the fan based on the profile and control the fan speed of the fan by setting the fan speed to the desired fan speed determined by the secondary management device.

An example method includes determining, by a primary management device, a desired fan speed of a fan to cool at least a hardware component, based on a first characteristic that is one of a temperature of the hardware component and power provided by a power device to at least the hardware component. The method includes setting, by a secondary management device, a fan speed of the fan to the desired fan speed determined by the primary management device. The method includes constructing, by the secondary management device, a profile of the fan speed in relation to a second characteristic that is one of the temperature of the hardware component and the power provided by the power device to at least the hardware component, by periodically recording the fan speed and the second characteristic, the second characteristic different than the first characteristic. The method includes, in response to the primary management device failing, determining, by the secondary management device, the desired fan speed of the fan based on the profile and setting, by the secondary management device, the fan speed to the desired fan speed determined by the secondary management device.

An example non-transitory computer-readable data storage medium stores computer-executable code that a secondary management device executes to perform a method. The method includes receiving a desired fan speed of a fan to cool at least a hardware component from a primary management device that determines the desired fan speed based on a first characteristic that is one of a temperature of the hardware component and power provided by a power device to at least the hardware component. The method includes setting the fan speed of the fan to the desired fan speed determined by the primary management device. The method includes constructing a profile of the fan speed in relation to a second characteristic this is one of the temperature of the hardware component and the power provided by the power device to at least the hardware component, by periodically recording the fan speed and the second characteristic, the second characteristic different than the first characteristic. The method includes, in response to the primary management device failing, determining the desired fan speed of the fan based on the profile and setting the fan speed to the desired fan speed determined by the secondary management device.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION

Figure 1:
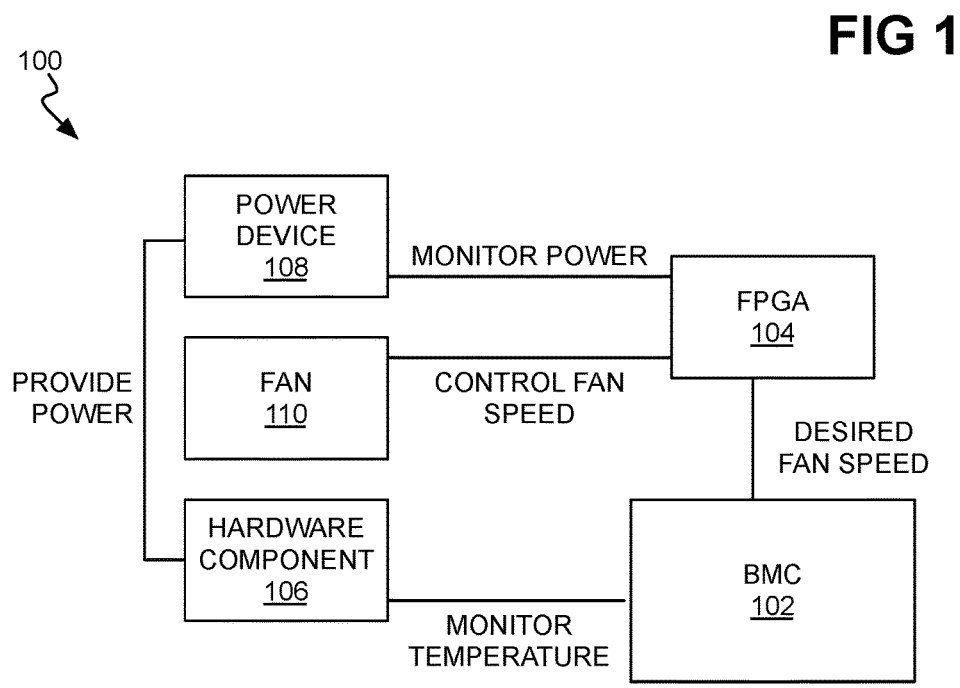
FIG. 1 is a diagram of an example server having a baseboard management controller (BMC) and a field programmable gate array (FPGA).

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the embodiment of the invention is defined only by the appended claims.

As noted in the background section, a computing device like a server includes hardware components that generate heat, and can include fans to exhaust this heat from the computing device's enclosure or case. The fan speeds of the fans are usually variable. As the temperature of a hardware component or subsystem increases, the fan speed of a corresponding fan increases. Similarly, as the temperature decreases, the fan's fan speed decreases.

In particular, a server, in addition the hardware components like processors, memory, and hard disk drives that provide for the primary functionality of the server, can include a primary management device, such as a baseboard management controller (BMC), which can also be referred to as an integrated management module (IMM). A BMC is a specialized service processor or service processor assembly that monitors the physical state of the server, and permits remote management of the server, without taxing the hardware components that provide for the server's primary functionality. Furthermore, when these hardware components fail, or if the software running on these hardware components fail, the server can still be accessed via the BMC.

The BMC within a server can be responsible for determining the appropriate, or desired, fan speed for each fan within the server. A BMC is a relatively complex device, and therefore can have a sophisticated algorithm that it uses to determine what the fan speed of each fan should be, based on, for instance, the current temperature of the hardware component(s) that a fan is responsible for cooling. In this way, acoustic efficiency of the server is achieved, as well as power efficiency, ensuring that the server is as quiet as possible and its fans use as little power as possible while still maintaining the operational temperatures of the hardware components.

In some types of servers, a BMC is assisted by a field programmable gate array (FPGA), or other secondary management device, onto which some tasks and functionality of server management can be offloaded. For instance, the FPGA may be responsible for actually controlling the fans by setting their fan speeds. In this type of topology, then, while the BMC determines the desired fan speed at which a fan is to be set, the FPGA is the component that actually sets the fan speed to the desired fan speed.

The FPGA is a less complex device than the BMC is. That is, the processing power, memory, and so on of the BMC can be at least an order of magnitude or more than that of the FPGA. This means that the FPGA cannot perform as sophisticated of processing as the BMC can. However, by virtue of the FPGA being less complex, this also means that the FPGA is much less likely to fail than the BMC.

When the BMC of a server fails, conventionally there is no device that determines the appropriate or desired fan speed at which to run each fan of the server. Therefore, typically what occurs is that the FPGA immediately runs each fan at its maximum speed. That is, because the FPGA does not know what the fan speed each fan should run at to ensure the proper cooling of the hardware components of the server, the FPGA assumes a worst-case scenario of maximum heat generation by the components, and thus increases each fan's fan speed to the maximum speed.

While increasing all the fans within a server to operate at their maximum fan speeds does ensure that the server will not overheat, nevertheless this approach is decidedly disadvantageous. First, the acoustic performance of the server suffers, insofar as having all the fans run at their fastest setting results in their being quite loud. Second, the power consumption of the server increases as well, because fans require more power to run at faster speeds.

Techniques disclosed herein ameliorate these shortcomings. In one implementation, a power device, such as a power supply, a voltage regulator module (VRM), a processor power module (PPM), or a voltage regulator-down module (VRD), is used to power a hardware component that is cooled by a fan. The BMC may monitor the temperature of the hardware component, and using its built-in algorithm determine the desired fan speed at which the fan should run based on this temperature. If the BMC fails, the FPGA instead determines the desired fan speed at which the fan should run.

The FPGA determines the desired fan speed at which the fan should run in one implementation as follows. While the BMC is operational, the FPGA periodically records the fan speed and the power being provided by the power device to construct a profile of the fan speed in relation to this power. When the BMC fails, the FPGA determines the desired fan speed based on the current power being provided by the power device. That is, whereas the BMC determines desired fan speed based on the current temperature of the hardware component, the FPGA does based on the current power provided by the power device.

As noted above, the FPGA is a less complex device than the BMC is. Therefore, the FPGA's fan speed determination is not as accurate as the BMC's is. The FPGA constructs a profile to determine fan, which is not as accurate as the BMC determining fan speed. This means in effect that the profile constructed by the FPGA corresponds to or is an approximation of the algorithm that the BMC uses to determine fan speed.

However, in many situations, the failure of the BMC is temporary, and the BMC may reboot itself and come back online a short time after it went down. For this period of time, the approximated fan speed determination by the FPGA as compared to the more accurate fan speed determination by the BMC is usually more than satisfactory to provide better acoustic performance and power consumption of the server while still ensuring that the server does not overheat. In one implementation, though, out of an abundance of caution, if the BMC does not come back online after a length of time, such as ten minutes, then the BMC increases the fan speed of the fan to its maximum speed. As such, the techniques disclosed herein have the BMC normally determine fan speed of each fan within a server, and have the FPGA determine fan speed just when the BMC has failed, for at least a short period of time.

It is noted that the implementation described below is in relation to the BMC determining fan speed on the basis of hardware component temperature (which the BMC can monitor) and the FPGA determining fan speed on the basis of power being provided by a power device (which the FPGA can monitor). However, the reverse can be implemented as well. That is, the BMC may determine fan speed based on the power being provided by a power device when the BMC instead monitors this power, and the FPGA can determine fan speed on the basis of hardware component temperature when the FPGA instead monitors this temperature. More generally, then, it is said that the BMC monitors and controls fan speed on the basis of a first characteristic (e.g., temperature or power) and the FPGA monitors and controls fan speed on the basis of a second characteristic (e.g., power or temperature) different than the first characteristic.

FIG. 1 shows an example server 100. The server 100 is more generally a computing device, which is itself more generally a computing system. The server 100 includes a BMC 102, an FPGA 104, a hardware component 106, a power device 108, and a fan 110.

As noted above, the BMC 102 can also be referred to as an IMM, and is more generally a primary management device of the server 100. A BMC is a specialized service processor or service processor assembly that monitors the physical state of the server, and permits remote management of the server 100, without taxing the hardware components that provide for the server 100's primary functionality.

Furthermore, when these hardware components fail, or if the software running on these hardware components fail, the server 100 can still be accessed via the BMC 102.

As also noted above, the FPGA 104 assists the BMC 102, by the BMC 102 offloading some tasks and functionality of server management onto the FPGA 104. The FPGA 104 is more generally a secondary management device of the server 100. Other examples of secondary management devices include reconfigurable processors and application-specific integrated circuits (ASICs). The FPGA 104 is a less complex device than the BMC 102 is. That is, the processing power, memory, and so on of the BMC 102 can be at least an order of magnitude or more than that of the FPGA 104. This means that the FPGA 104 cannot perform as sophisticated of processing as the BMC 102 can. However, by virtue of the FPGA 104 being less complex, this also means that the FPGA 104 is much less likely to fail than the BMC 102.

The hardware component 106 can be a primary processor of the server 100, memory, a hard disk drive, or another type of hardware component. Although there is more than one such hardware component 106 within the server 100, for illustrative and descriptive convenience just one such component 106 is shown in FIG. 1. The hardware component 106 is used to perform the primary processing functionality of the server 100, and as such is not part of the BMC 102 or the FPGA 104.

The power device 108 may be a power supply, a VRM, a PPM, a VRD, or another type of power device 108. The power device 108 provides power at least to the hardware component 106. If the power device 108 is responsible for providing power to a zone or subassembly of the server 100, then the hardware component 106 is part of this zone or subassembly. The power device 108 has a maximum power that it can supply. However, at any given time, the power device 108 provides the amount of power that is being drawn by the hardware component 106 or zone or assembly for which it is responsible, which is usually less than the maximum amount of power it can provide. Stated another way, the amount of power that the power device 108 is currently providing to the hardware component 106 or zone or assembly is equal to the power that the hardware component 106 or zone or assembly is currently consuming. Although there can be more than one power device 108 within the server 100, for illustrative and descriptive convenience just one such device 108 is shown in FIG. 1.

The fan 110 cools at least the hardware component 106, such as by removing air heated by the hardware component 106 away from the component 106, which may be exhausted by the fan 110 or another fan outside the enclosure or housing of the server 100. The cooling achieved by the fan 110 may instead occur by directing cooler air from outside the enclosure or housing towards at least the hardware component 106. If the fan 110 is responsible for cooling a zone or subassembly of the server 100, then the hardware component 106 is part of this zone or assembly. Although there can be more than one fan 110 within the server 100, for illustrative and descriptive convenience just one such fan 110 is shown in FIG. 1.

The BMC 102 monitors the temperature of the hardware component 106. For instance, the BMC 102 may be connected directly to the hardware component 106, or via a bus, by which the BMC 102 can periodically retrieve the current temperature of the component 106 as measured by a temperature sensor of the component 106. The BMC 102 determines the desired fan speed at which the fan 110 should operate based on this monitored temperature. Because the BMC 102 is a relatively complex device, it can employ a sophisticated algorithm to determine the fan speed, based, for instance, on the temperatures of other hardware components as well, on the physical locations of the fans and hardware components within the enclosure or housing of the server 100, on the physical volume or space within the enclosure or housing, and so on. The BMC 102 may use a previously constructed lookup table preprogrammed in the BMC 102 to determine the desired fan speed of the fan 110 based on these and other variables or parameters, including at least the temperature of the hardware component 106.

The BMC 104 informs the FPGA 104 the desired fan speed of the fan 110. In this respect, the BMC 104 and the FPGA 104 may be connected to one another directly, or via a bus. The FPGA 104 likewise is connected to the fan 110 directly or via a bus. When the FPGA 104 receives the desired fan speed of the fan 110, it correspondingly controls the fan 110 to operate at this fan speed. The FPGA 104 further may be directly connected to the power device 108 or via a bus. Over this connection, the FPGA 104 can monitor the power provided by the power device 108 to at least the hardware component 106 (and to, for instance, any other components within the zone or subassembly that the power device 108 is responsible for powering). That is, the FPGA can periodically retrieve the current power that the power device 108 is providing, as measured by the power device 108 itself.

Figure 2:
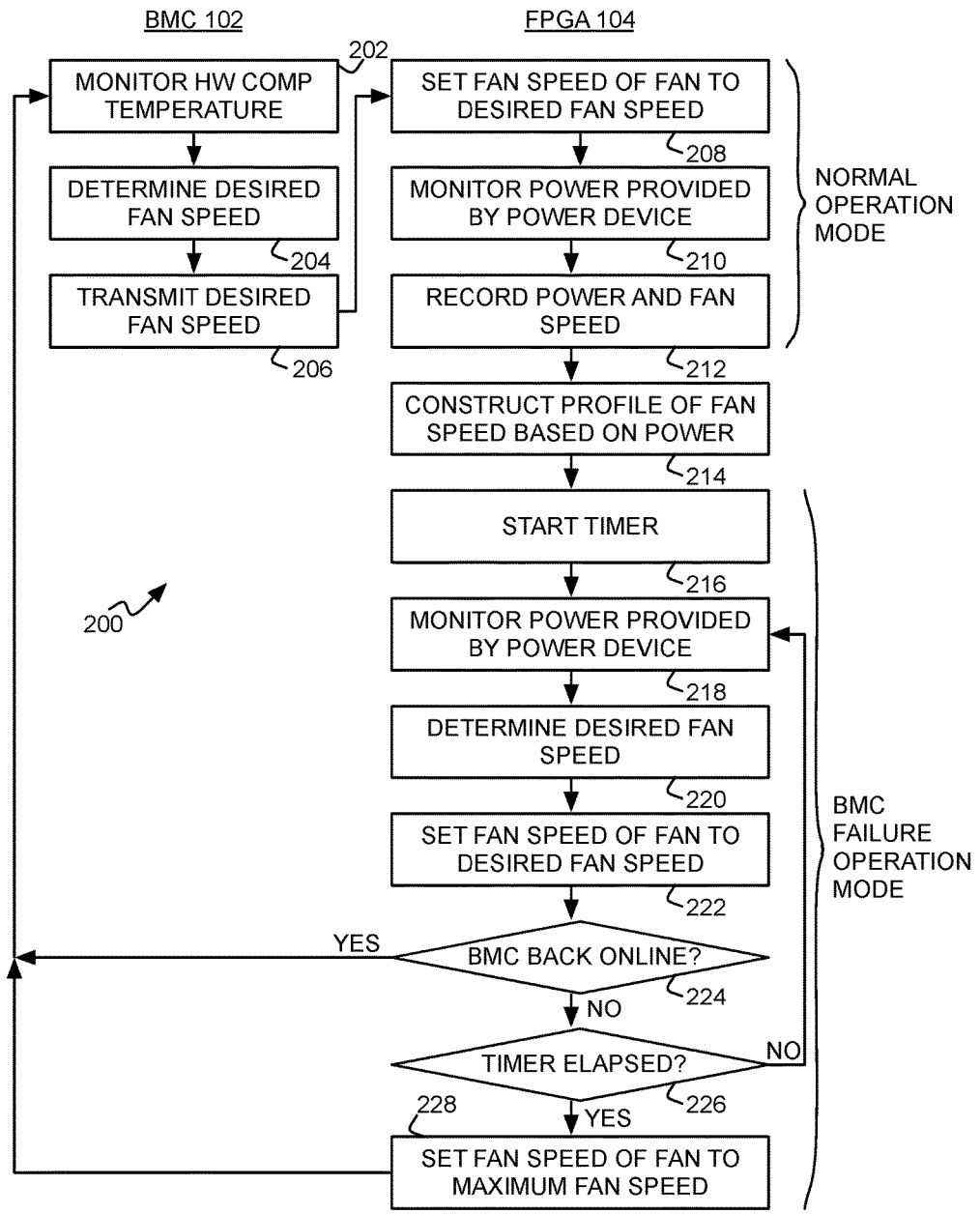
FIG. 2 is a flowchart of an example method for an FPGA of a server determining the fan speed at which a fan of the server should operate when a BMC of the server that normally makes this determination has failed.

FIG. 2 shows an example method 200 by which the FPGA 104 determines the fan speed at which the fan 110 operates when the BMC 102, which normally makes this determination, has failed. The method 200 is divided into a normal operation mode, encompassing parts 202, 204, 206, 208, 210, and 212, and a BMC failure operation mode, encompassing parts 216, 218, 220, 222, 224, 226, and 228. Further, part 214 can be performed as part of the normal operation mode or as part of the BMC failure operation mode. In the former mode, the BMC 102 is operational and determines the fan speed at which the fan 110 runs; in the latter mode, the BMC 102 has failed (i.e., is offline) and the FPGA 104 determines the fan speed at which the fan 110 runs. The parts of the method 200 in the left column are performed by the BMC 102, and the parts of the method 200 in the right column are performed by the FPGA 104.

In the normal operation mode, the BMC 102 monitors the temperature of the hardware component 106 (202), and based at least on the current temperature of the component 106 determines the desired or optimal fan speed for the fan 110 (204), as has been described. The BMC 102 transmits this desired fan speed to the FPGA 104 (206). Upon receiving the desired fan speed 206 from the BMC 102, the FPGA 104 controls the fan 110 by setting the speed of the fan 110 to the desired fan speed determined by the BMC 102 (208).

The FPGA 104 also monitors the power that the power device 108 is currently providing to at least the hardware component 106 (210), and periodically records the current power being provided by the power device 108 and the fan speed of the fan 110, which is the desired fan speed that the BMC 102 has determined (212). The FPGA 104 may be able to store a limited number of such power-fan speed pairs, as separate records, due to its limited memory capabilities. For example, the FPGA 104 may store just the most recent five (or other number) of such power-fan speed pairs, or may store just the most recent five (or other number) unique power-fan speed pairs. In the latter case, for instance, if a power-fan speed pair is already present within the five (or other number) unique pairs (such as within a threshold of uniqueness), then it is not recorded again, but rather is recorded only if it is not already present, such that the oldest unique pair is overwritten or otherwise no longer stored.

The FPGA 104 constructs a profile of fan speed based on the power provided by the power device 108 (214). In one implementation, profile construction can occur in the normal operation mode, such that the profile is periodically updated as new power-fan speed pairs are recorded in part 212. The profile construction may be in the form of determining a function that empirically approximates to some extent the algorithm that the BMC 102 uses to determine fan speed, which is not known to the FPGA 104. For instance, the function may be a linear function that is determined using linear regression from the currently recorded power-fan speed pairs, or a polynomial or other non-linear function that is determined using another curve-fitting technique from the currently record power-fan speed pairs. The function outputs the desired fan speed as a function of the current power being provided by the power device 108.

The normal operation mode continues via performance of parts 202, 204, 206, 208, 210, and 212 as has been described while the BMC 102 remains operational and online. If the BMC 102 fails, however, then the method 200 proceeds to the BMC failure operation mode. In the implementation described in the previous paragraph, the FPGA 104 constructs the profile of fan speed based on the power provided by the power device 108 in part 214 as part of normal operation mode, but in another implementation, part 214 can be performed as part BMC failure operation mode. In such an implementation, the profile can be constructed in the order depicted in FIG. 2—between parts 214 and 218—but in another implementation can be constructed as part of part 220, as will be described.

As part of the BMC failure operation mode, the FPGA 104 can start a timer. For example, the timer may be a countdown timer that is initially set to a predetermined time value, such as ten minutes, and then counts down to zero, or it may be a timer that is initially set to zero and then counts up to a desired value, such as again ten minutes. The FPGA 104 monitors the power provided by the power device 108 (218). If the power provided by the power device 108 has changed in value (such as by more than a threshold), then the FPGA 104 determines the desired fan speed (220). If the fan speed-power profile has already been constructed, then the desired fan speed may be determined by simply plugging in the current power being provided by the power device 108 into a previously determined function to obtain the desired fan speed.

However, if the fan speed-profile has not yet been constructed, then the profile is first constructed as part of part 220. In one implementation, the fan speed-power profile is constructed as has been described, such as by using a linear regression or other curve-fitting technique to determine a function based on the fan speed-power pairs that were previously recorded (and that were not overwritten or removed) during the normal operation mode. In this implementation, the profile may be constructed just the first time part 220 is performed, since the profile would not change if reconstructed while the method 200 remains in the BMC failure operation mode.

In another implementation, the profile may be constructed based on the specific amount of power that the power device 108 is currently providing. As one example, if the current power is both less than the power of at least one of the fan speed-power pairs that were previously recorded (and that were not overwritten or removed) and greater than the power of at least one other of the pairs that were previously recorded (and that were not overwritten or removed), then the profile can be constructed as follows. The fan speed-power pair having a power that is closest to but not greater than the current power is determined, as a first pair, and the fan speed-power pair having a power that is closest to but not less than the current power is also determined, as a second pair. The profile is then constructed as the function $$f(p) = p_1 + \frac{p_2 - p_1}{f_2 - f_1} p.$$

In this equation, $p_1$ is the power of the first fan-speed power pair, $f_1$ is the fan speed of the first pair, $p_2$ is the power of the second fan-speed power pair, and $f_2$ is the fan speed of the second pair. This approach is thus a linear regression that considers just the two closest fan speed-power pairs to either side of the currently provided power.

Therefore, in this implementation, the desired fan speed, f, is determined by plugging the power that the power device 108 is currently providing, p, into this function. Because the identification of the first and second pairs in question can differ depending on the power that the power device 108 is currently providing, the profile is reconstructed each time the desired fan speed is to be determined in part 220. In a third implementation, the desired fan speed is set to the fan speed of the fan speed-power pair having a power that is closest to but not less than the power that the power device 108 is currently providing. Having the desired fan speed set to the fan speed of the pair having a power that is closest to but not less than the power that the power device 108 is currently providing provides may ensure that the FPGA 104 does not set the fan speed to a value lower than the BMC 102 would if it were operational.

However, in a fourth implementation, the desired fan speed is set to the fan speed of the pair having a power that is closest to the power that the power device 108 is currently providing, regardless of whether it is less than or greater than the currently provided power. In this implementation, the desired fan speed may be set more accurately than in the prior implementation, but with the risk that the FPGA 104 may set the fan speed to a value lower than the BMC 102 would if it were operational. Finally, in any given implementation, in general, if the power that the power device 108 is currently providing is equal to the power of any fan speed-power pair (such as within a threshold), then the desired fan speed may be determined as equal to the fan speed of this pair.

The FPGA 104 sets the fan speed of the fan 110 to the desired fan speed that the FPGA 104 has determined (222). If at any point the BMC 102 comes back online and is thus operational (224), the method 200 reverts to the normal operation mode, and the FPGA 104 yields desired fan speed determination back to the BMC 102. If the BMC 102 remains offline (224), and the timer has not elapsed (226), then the method 200 remains in the BMC failure operation mode, in which the FPGA 104 continues to at least periodically monitor the power provided by the power device 108 in part 218, determine the desired fan speed in part 220, and set the fan speed of the fan 110 to the desired fan speed in part 222, as has been described.

In the implementation in which a timer is employed, if the BMC 102 remains offline (224), and the timer has elapsed (226)—i.e., the timer has reached zero if counting down, or has reached a predetermined value if counting up—then the FPGA 104 exits the repeating process of parts 218, 220, and 222 in which the FPGA 104 sets the fan speed of the fan 110 to a desired fan speed based on the power that the power device 108 is currently providing. Rather, the FPGA 104 instead sets the fan speed of the fan 110 to its maximum fan speed (228). As noted above, this is achieved to compensate for the fact that the FPGA 104's determination of the desired fan speed is an approximation of the algorithm that the BMC 102 uses, and thus may be inaccurate. Such inaccuracy may be tolerable for a brief period of time, such as ten minutes, but out of an abundance of caution, the fan speed of the fan 110 is set to maximum thereafter to ensure that no overheating of the at least the hardware component 106 occurs. Once the fan speed of the fan 110 has been set to a maximum speed, if the BMC 102 comes back online and is again operational, then the method 200 proceeds back to the normal operation mode.

The techniques disclosed herein therefore provide for controlling fan speed of the fan 110 for at least a predetermined length of time by the FPGA 104 if the BMC 104 fails and goes offline. During this time, acoustic and power performance of the server 100 are better maintained, by the FPGA 104, than if the fan speed of the fan 110 were simply set to its maximum speed. Furthermore, if the accuracy by which the FPGA 104 can properly set fan speed to prevent overheating of at least the hardware component 106 is suspect, then the length of time in which the FPGA 104 so controls fan speed can be limited by using a timer has been described—after which, the fan 110 is set to its maximum speed.

It is finally noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. Examples of non-transitory computer-readable media include both volatile such media, like volatile semiconductor memories, as well as non-volatile such media, like non-volatile semiconductor memories and magnetic storage devices. It is manifestly intended that this invention be limited only by the claims and equivalents thereof.

We claim:

1. A computing system comprising:
    a hardware component;
    a power device to provide power to at least the hardware component;
    a fan to cool at least the hardware component;
    a primary management device to monitor a first characteristic that is a temperature of the hardware component, and to determine a desired fan speed of the fan based on the first characteristic; and
    a secondary management device to:
        monitor a second characteristic that is the power provided by the power device to at least the hardware component;
        control a fan speed of the fan by setting the fan speed to the desired fan speed determined by the primary management device;
        construct a profile of the fan speed in relation to the second characteristic by periodically recording the fan speed as controlled via setting the fan speed to the desired fan speed determined by the primary management device, and the second characteristic; and
        in response to the primary management device failing, determine the desired fan speed of the fan based on the profile and control the fan speed of the fan by setting the fan speed to the desired fan speed determined by the secondary management device.

2. The computing system of claim 1, wherein in response to the primary management device failing, the secondary management device is further to:
    start a timer; and
    in response to the timer reaching a predetermined value, control the fan speed of the fan by setting the fan speed of the fan to a maximum fan speed.

3. The computing system of claim 1, wherein the desired fan speed is normally determined by the primary management device, and is determined by the secondary management device just when the primary management device has failed.

4. The computing system of claim 1, wherein the primary management device is to determine the desired fan speed based on the first characteristic using an algorithm,
    wherein the secondary management device is to determine the desired fan speed based on the profile constructed by periodically recording the fan speed and the second characteristic, such that the profile corresponds to an approximation of the algorithm.

5. The computing system of claim 1, wherein the primary management device is a more complex device than the secondary management device.

6. The computing device of claim 5, wherein the primary management device is one of a baseboard management controller (BMC) and an integrated management module (IMM),
    and wherein the secondary management device is one of a field-programmable gate array (FPGA), a reconfigurable processor, and an application-specific integrated circuit (ASIC).

7. The computing system of claim 1, wherein the first characteristic is the temperature of the hardware component, and the second characteristic is the power provided by the power device to at least the hardware component.

8. The computing system of claim 7, where the primary management device is connected to the hardware component to monitor the temperature of the hardware component,
    wherein the primary management device is connected to the secondary management device,
    wherein the secondary management device is connected to the power device to monitor the power provided by the power device to at least the hardware component,
    and wherein the secondary management device is connected to the fan to control the fan speed of the fan.

9. The computing system of claim 1, wherein the power device is one of a: power supply, a voltage regulator module (VRM), a processor power module (PPM), and a voltage regulator-down module (VRD).

10. The computing system of claim 1, wherein the hardware component is one of: a hard disk drive, a solid state drive, a volatile memory, and a primary processor of the computing system.

11. A method comprising: determining, by a primary management device, a desired fan speed of a fan to cool at least a hardware component, based on a first characteristic that is a temperature of the hardware component;
    setting, by a secondary management device, a fan speed of the fan to the desired fan speed determined by the primary management device;
    constructing, by the secondary management device, a profile of the fan speed in relation to a second characteristic that is the power provided by the power device to at least the hardware component, by periodically recording the fan speed as controlled via setting the fan speed to the desired fan speed determined by the primary management device, and the second characteristic, the second characteristic different than the first characteristic; and in response to the primary management device failing, determining, by the secondary management device, the desired fan speed of the fan based on the profile and setting, by the secondary management device, the fan speed to the desired fan speed determined by the secondary management device.

12. The method of claim 11, further comprising, in response to the primary management device failing:

starting, by the secondary management device, a timer; and in response to the timer reaching a predetermined value, setting, by the secondary management device, the fan speed of the fan to a maximum fax speed.

13. The method of claim 11, wherein the desired fan speed is normally determined by the primary management device, and is determined by the secondary management device just when the primary management device has failed.

14. The method of claim 11, wherein the primary management device is to determine the desired fan speed based on the first characteristic using an algorithm, wherein the secondary management device is to determine the desired fan speed based on the profile constructed by periodically recording the fan speed and the second characteristic, such that the profile corresponds to an approximation of the algorithm.

15. The method of claim 11, wherein the primary management device is a more complex device than the secondary management device, wherein the primary management device is one of a baseboard management controller (BMC) and an integrated management module (IMM), and wherein the secondary management device is one of a field-programmable gate array (FPGA), a reconfigurable processor, and an application-specific integrated circuit (ASIC).

16. A non-transitory computer-readable data storage medium storing computer-executable code that a secondary management device executes to perform a method comprising: receiving a desired fan speed of a fan to cool at least a hardware component from a primary management device that determines the desired fan speed based on a first characteristic that is a temperature of the hardware component;

setting the fan speed of the fan to the desired fan speed determined by the primary management device;

constructing a profile of the fan speed in relation to a second characteristic that is the power provided by the power device to at least the hardware component, by periodically recording the fan speed as controlled via setting the fan speed to the desired fan speed determined by the primary management device, and the second characteristic, the second characteristic different than the first characteristic; and in response to the primary management device failing, determining the desired fan speed of the fan based on the profile and setting the fan speed to the desired fan speed determined by the secondary management device.

17. The non-transitory computer-readable data storage medium of claim 16, wherein the method further comprises, in response to the primary management device failing:

starting a timer; and in response to the timer reaching a predetermined value, setting the fan speed of the fan to a maximum fax speed.

18. The non-transitory computer-readable data storage medium of claim 16, wherein the desired fan speed is normally determined by the primary management device, and is determined by the secondary management device just when the primary management device has failed.

19. The non-transitory computer-readable data storage medium of claim 16, wherein the primary management device is to determine the desired fan speed based on the first characteristic using an algorithm, wherein the secondary management device is to determine the desired fan speed based on the profile constructed by periodically recording the fan speed and the second characteristic, such that the profile corresponds to an approximation of the algorithm.

20. The non-transitory computer-readable data storage medium of claim 16, wherein the primary management device is a more complex device than the secondary management device, wherein the primary management device is one of a baseboard management controller (BMC) and an integrated management module (IMM), and wherein the secondary management device is one of a field-programmable gate array (FPGA), a reconfigurable processor, and an application-specific integrated circuit (ASIC).

* * * * *